(Model.)

W. KLAHR.
BICYCLE.

No. 285,821. Patented Oct. 2, 1883.

Witnesses:
E. E. S. Leffler
T. M. Gass

William Klahr, Inventor.

UNITED STATES PATENT OFFICE.

WILLIAM KLAHR, OF MYERSTOWN, PENNSYLVANIA.

BICYCLE.

SPECIFICATION forming part of Letters Patent No. 285,821, dated October 2, 1883.

Application filed March 5, 1883. (Model.)

*To all whom it may concern:*

Be it known that I, WILLIAM KLAHR, a citizen of the United States, residing at Myerstown, in the county of Lebanon and State of Pennsylvania, have invented an Improvement in Bicycles, of which the following is a specification.

My invention relates to improvements in bicycles; and it consists in the peculiar construction and arrangement of the parts, as herein more fully set forth, and pointed out in the claims.

Figure 1:
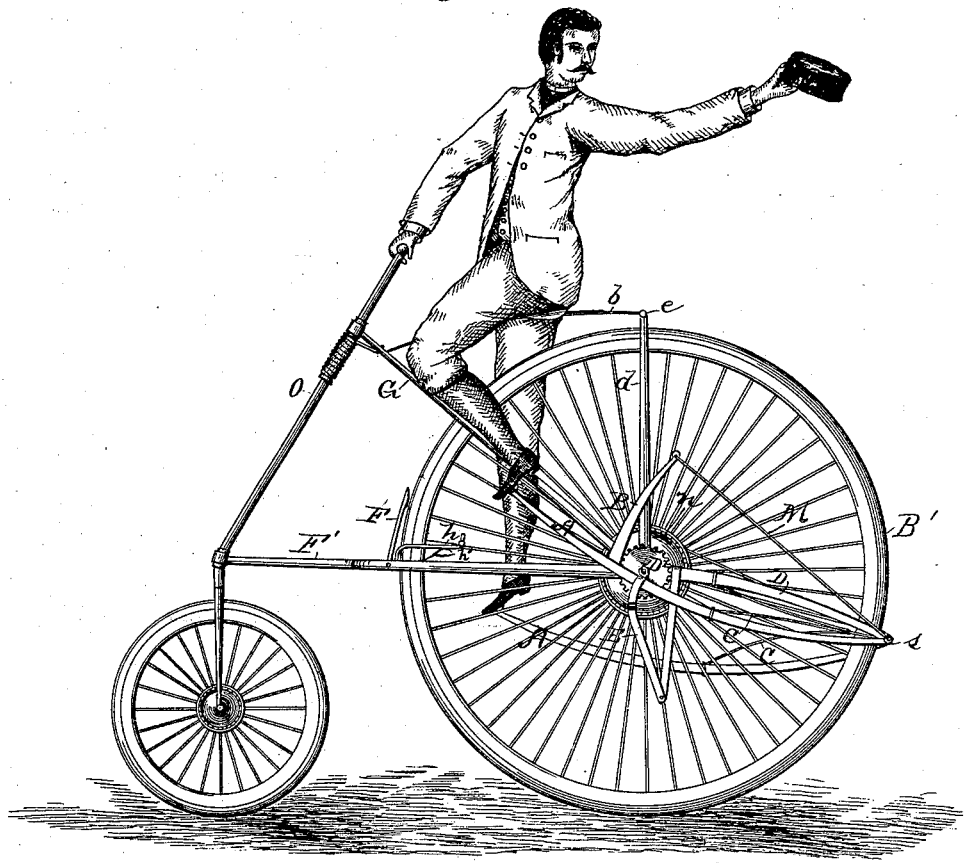
Figure 2:
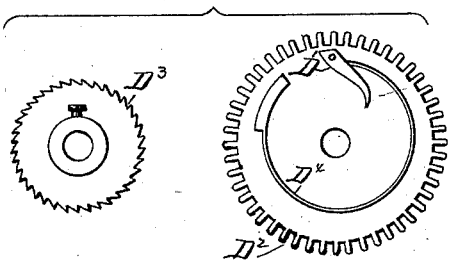
Figure 3:
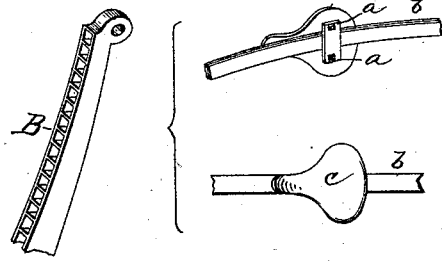

Figure 1 is a perspective view; Fig. 2, the pawl-and-ratchet mechanism; Fig. 3, the rack shown in perspective, and Fig. 4 a plan and bottom view of the saddle and spring.

Similar letters refer to similar parts.

A A in Fig. 1 are the pedals, operated by the feet, and pivoted at $s$ at the rear of the large wheel B', the upward or reverse action being given by springs C to the pedals pivoted at the same place, and fastened with a link, D, to the frame-bar, extending from the hub $n$ of the large wheel to the pivot at the rear of the wheel, the lower portion of the same springs being attached to the pedals by a similar link.

B are the racks shown in Figs. 1 and 3, attached to the pedals A A, and are supported by connecting-rods M, which are pivoted also at the rear end of the large wheel at $s$. These racks B operate the power-wheel B', on the inside of which is the pawl-and-ratchet mechanism, as shown in Fig. 2 of the drawings.

Figure 4:
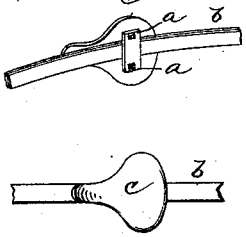

The letter $c$ in Fig. 4 is the saddle, which is movable, and can be regulated to suit the rider. It is fastened to the spring with two nuts, $a$ $a$. The spring $b$ is fastened at the rear, as shown in Fig. 1, to vertical bars $d$, extending from the hub $n$ to the top of the large wheel B', and from thence forward to the lever-rod O, used for guiding the bicycle. The rod C extends from the hub diagonally to the lever O, and holds in position the spring $b$ of the saddle by means of a pin, $e$, passing through the eye of the spring $b$.

D' is a pawl pivoted to the large gear-wheel $D^2$ and engaging with the ratchet-wheel $D^3$. $D^4$ is a spring, the function of which is to hold the pawl down to engage with the ratchet-wheel, as shown in Fig. 2, and constitutes the propelling force of the bicycle. The gear-wheel $D^2$ is loose on the axle of the wheel B' and the ratchet-wheel $D^3$ is tight thereon. This mechanism is pivoted on the axle and operated by the rack B shown in Fig. 3, the latter, B, connected with the pedal A.

E is the step, pivoted at the axle of the large wheel, the rods forming the step extending from the axles on the outside of the pedals, down $u$, upward on the inside of said pedals to the link D, thus forming guides for the pedals to the horizontal rod pivoted at the rear of the large wheel, forming a brace to the pedals.

F is the brake, pivoted to a horizontal bar, F', extending from the axle of the large wheel B' forward to the lower portion of the guiding lever-rod O, which controls the small wheel. This brake F is operated by a lever, $h$, upon which the foot is placed, and it recedes by the action of a spring, $h'$, which throws the brake F from the tire of the wheel.

Heretofore bicycles have been operated either by a crank or a lever, while I claim—

1. The combination, with the pedals A, link D, and spring C, of the rack-bar B, secured to said pedals, gear-wheel $D^2$, ratchet-wheel $D^3$, and spring-pawl D', substantially as shown and described.

2. The combination, with the vertical bars $d$, having eyes $e$ at their upper ends, of the spring $b$, carrying the adjustable saddle $c$, and lever O, substantially as shown and described.

3. The combination, with the pedals A, of the steps E, secured to the axle, and link D, said steps forming guides for the pedal, substantially as shown and described.

WILLIAM KLAHR.

Witnesses:
V. M. GASS,
JOHN MILLICHRACK.